(12) United States Patent
Bergquist et al.

(10) Patent No.: US 12,715,474 B2
(45) Date of Patent: Aug. 25, 2026

(54) METHOD FOR CONTROLLING A MAXIMUM ALLOWED SPEED OF AN AUTONOMOUS VEHICLE

(71) Applicant: Volvo Autonomous Solutions AB, Gothenburg (SE)

(72) Inventors: Stefan Bergquist, Gothenburg (SE); Linus Hagvall, Gothenburg (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 193 days.

(21) Appl. No.: 18/578,160

(22) PCT Filed: Jul. 16, 2021

(86) PCT No.: PCT/EP2021/070027
§ 371 (c)(1),
(2) Date: Jan. 10, 2024

(87) PCT Pub. No.: WO2023/284982
PCT Pub. Date: Jan. 19, 2023

(65) Prior Publication Data
US 2024/0317267 A1 Sep. 26, 2024

(51) Int. Cl.
*B60W 60/00* (2020.01)
*B60W 30/09* (2012.01)

(52) U.S. Cl.
CPC ........ *B60W 60/0018* (2020.02); *B60W 30/09* (2013.01); *B60W 2556/20* (2020.02); *B60W 2720/10* (2013.01)

(58) Field of Classification Search
None
See application file for complete search history.

(56) References Cited

U.S. PATENT DOCUMENTS

2011/0158480 A1 6/2011 Lin et al.
2019/0277646 A1* 9/2019 Iagnemma ......... G01C 21/3691
(Continued)

FOREIGN PATENT DOCUMENTS

DE 102017202363 A1 8/2018
DE 102019206026 A1 10/2020
EP 3196089 A1 7/2017

OTHER PUBLICATIONS

International Search Report and Written Opinion of the International Searching Authority in corresponding International Application No. PCT/EP2021/070027 mailed Apr. 20, 2022 (12 pages).

*Primary Examiner* — Abdhesh K Jha
*Assistant Examiner* — David Hatch
(74) *Attorney, Agent, or Firm* — Jeffri A. Kaminski; Venable LLP

(57) ABSTRACT

A first sensor performance level is used during driving where a vehicle is allowed to drive with a first maximum allowed speed, and while utilizing the first sensor performance level, simultaneously monitoring a rate of false positive object detections for a second sensor performance level which is associated with a second maximum allowed speed which is higher than the first maximum allowed speed and which is a less restrictive sensor performance level. When the rate of false positive object detections for the second sensor performance level is below a first false positive error threshold, a sensor performance level that is less restrictive than the first sensor performance level is used, and is associated with a higher maximum allowed speed equal to or lower than the second maximum allowed speed.

16 Claims, 4 Drawing Sheets

(56) References Cited

U.S. PATENT DOCUMENTS

2020/0133281 A1 4/2020 Gomez Gutierrez et al.
2021/0037204 A1* 2/2021 Moon .................... H04N 25/42
2021/0403012 A1* 12/2021 Keller ............... B60W 50/0205

* cited by examiner

| Field | Field of view (m) | Max speed (km/h) |
|---|---|---|
| 1 | 7 | 15 |
| 2 | 5 | 10 |
| 3 | 3 | 5 |

METHOD FOR CONTROLLING A MAXIMUM ALLOWED SPEED OF AN AUTONOMOUS VEHICLE

CROSS-REFERENCE TO RELATED APPLICATIONS

This application is a U.S. National Stage application of PCT/EP2021/070027, Jul. 16, 2021 and published on Jan. 19, 2023 as WO 2023/284982, all of which is hereby incorporated by reference in its entirety.

TECHNICAL FIELD

The invention relates to a method for controlling a maximum allowed speed of an autonomous vehicle. The invention further relates to a control unit, an autonomous vehicle, a computer program and to a computer readable medium.

The invention can be applied in heavy-duty vehicles, such as trucks, buses and construction equipment. Although the invention will be described with respect to a heavy-duty truck, the invention is not restricted to this particular vehicle, but may also be used in other vehicles such as other trucks, buses and passenger cars.

BACKGROUND

An autonomous vehicle is a vehicle which can drive autonomously without direct involvement from a human operator/driver and/or without a driver onboard the vehicle. The vehicle may be fully autonomous where all driving operations, including propulsion, braking and steering, are performed automatically without any direct human involvement. The vehicle may additionally or alternatively be semi-autonomous where at least some of the driving operations are performed automatically without any direct human involvement.

An autonomous vehicle requires to obtain information about its surroundings during driving in order to take appropriate actions, such as avoiding objects which are in the way of the vehicle's travelling path. It is therefore known to use object detection sensors, such as LIDAR(s), camera (s), RADAR(s), ultrasonic sensors etc. for detecting objects during driving.

There is a strive to develop autonomous vehicles which are able to drive at high speed without compromising with safety. Especially for commercial vehicles, such as cargo transporting vehicles and buses, it is important to achieve high productivity without compromising with safety.

SUMMARY

In view of the above, an object of the invention is to provide an improved method for controlling a maximum allowed speed of an autonomous vehicle without compromising with safety. A further object of the invention is to provide an improved control unit, autonomous vehicle, computer program and/or computer readable medium.

According to a first aspect, the object is achieved by a method according to claim 1.

Thus, a method for controlling a maximum allowed speed of an autonomous vehicle is provided. The autonomous vehicle comprises at least one object detection sensor which is configured to detect objects around the vehicle, such as ahead of the vehicle, when the vehicle is driving autonomously. The at least one object detection sensor is configured to utilize at least two different sensor performance levels, wherein each sensor performance level is associated with a maximum allowed speed for the autonomous vehicle.

The method comprises:

utilizing a first sensor performance level during driving where the vehicle is allowed to drive with a first maximum allowed speed, while utilizing the first sensor performance level, simultaneously evaluating at least a second sensor performance level which is associated with a second maximum allowed speed which is higher than the first maximum allowed speed and which is a less restrictive sensor performance level, wherein a less restrictive sensor performance level is a sensor performance level with a higher probability of false positive object detections, wherein evaluating the second sensor performance level comprises monitoring a rate of false positive object detections for the second sensor performance level, when the rate of false positive object detections for the second sensor performance level is below a first false positive error threshold, utilizing a less restrictive sensor performance level which is associated with a higher maximum allowed speed, thereby increasing the maximum allowed speed from the first maximum allowed speed to a speed which is equal to or below the second maximum allowed speed.

A false positive object detection is herein defined as a situation when the at least one object detection sensor detects an object which is not a true object. This may also be denoted a "ghost object" and may be defined as an object which is not an object intended to be reported by the object detection sensor. For example, during object detection it may be realized at a later occasion that a first object detection was not a true object, but rather a false positive object detection. For example, any one of rain, dust, snow, sun-glare etc. may result in that the at least one object detection sensor mistakenly reports an object. If the object detection is a false positive object detection or if it is a true object is typically realized after a certain time period, such as when the at least one object detection sensor has performed a number of consecutive sensor readings.

By the provision of the method as disclosed herein, the autonomous vehicle's productivity can be increased without compromising with safety. This is realized by evaluating different sensor performance levels as disclosed herein, wherein each sensor performance level is associated with a maximum allowed speed. Accordingly, the evaluation may result in that the maximum allowed speed of the vehicle can be increased, thereby for example enabling increased productivity. The evaluation may also result in that the maximum allowed speed cannot be increased. Thereby safety will not be compromised. In addition, by the method as disclosed herein, a simplified evaluation procedure is achieved. As such, the computing effort required for performing the evaluation can be reduced, implying cost-effectiveness and faster response. For example, the method is based on a realization to monitor false positive error reports instead of e.g. adapting the speed based on knowledge about current driving conditions, such as weather conditions. By the present invention, a less conservative approach may be achieved, i.e. a higher maximum allowed speed may be used, without compromising with safety.

Optionally, the first and second sensor performance levels may be part of a plurality of predetermined sensor performance levels associated with a respective predetermined maximum allowed speed, and optionally wherein increasing the maximum allowed speed comprises increasing the maximum allowed speed to the second maximum allowed speed. Thereby a discrete approach may be achieved, with distinct separate sensor performance levels which are associated with respective maximum allowed speeds, implying reduced computing effort and faster maximum speed adjustments without compromising with safety.

Optionally, the speed may be increased from the first maximum allowed speed to a maximum allowed speed below the second maximum allowed speed, which maximum allowed speed is associated with a sensor performance level which is more restrictive than the second sensor performance level, wherein a more restrictive sensor performance level is a sensor performance level with a lower probability of false positive object detections. Thereby, a non-discrete, e.g. continuous, approach may be achieved, wherein for example the sensor performance level can be adjusted within an interval, e.g. an interval with an upper limit corresponding to the second sensor performance level. Consequently, a more flexible method may be achieved, wherein the sensor performance level to be used can be better adapted to the current circumstances. Still optionally, the higher maximum allowed speed may be selected as a speed which is lower than the second maximum allowed speed and below the second maximum allowed speed with a predetermined safety margin. Thereby, a certain safety margin from the second maximum allowed speed can be used, e.g. implying increased safety.

Optionally, a sensor performance level may be defined by at least one of a sensor field of view, such as a detection distance and/or a detection view angle, a number of sensor readings before reporting detection of an object, and a size limit for a detected object, such as defined by a number of pixels in which an object is detected and/or a number of reflected points indicative of an object. A detection distance may be defined as a longest distance from which the at least one sensor can detect an object. A detection view angle may be defined as a largest angle interval within which the at least one object detection sensor can detect an object. For example, the number of sensor readings, or the number of samples, may be a number of sensor readings in which an object is detected before reporting detection of an object. The object may be regarded as detected when each one of a predefined number of sensor readings has detected the object. The sensor readings with the object detections may be conducted in consecutive order in order to report detection of an object. Additionally, or alternatively, the sensor readings with the object detections may be a number of sensor readings from a set of sensor readings in order to report detection of an object. Purely by way of example, an object detection sensor with a long detection distance, or detection range, may likely have a higher probability of reporting false positive object detections, whilst an object detection sensor with a relatively short detection distance may have a lower probability of reporting false positive object detections. However, the object detection sensor with the longer detection distance may utilize a relatively high maximum allowed speed, whilst the object detection sensor with the shorter detection distance may require utilizing a lower maximum allowed speed. Accordingly, the sensor performance level is higher for the object detection sensor with the longer detection distance compared to the sensor performance level of the object detection sensor with the shorter detection distance.

Optionally, the method may further comprise evaluating the first sensor performance level while the vehicle is utilizing the first sensor performance level, wherein evaluating the first sensor performance level comprises monitoring a rate of false positive object detections for the first sensor performance level, and when the rate of false positive object detections for the first sensor performance level is above a second false positive error threshold, decreasing the maximum allowed speed to a speed which is lower than the first maximum allowed speed. Thereby, when it is determined that there are too many false positive object detections, the maximum allowed speed may be decreased, implying that the reduced maximum allowed speed may result in fewer false positive object detections. As a result, a more comfortable and/or smooth driving may be achieved, e.g. resulting in fewer unnecessary braking actions for stopping the autonomous vehicle.

Optionally, decreasing the maximum allowed speed may comprise decreasing the maximum allowed speed to a lower predetermined speed which is associated with a predetermined sensor performance level which is more restrictive than the first sensor performance level, wherein a more restrictive sensor performance level is a sensor performance level with a lower probability of false positive object detections. Still optionally, the method may further comprise: if no more predetermined sensor performance level which is more restrictive is available, controlling the vehicle to perform a controlled stop.

Optionally, the method may further comprise:

monitoring if an object is detected while utilizing the first sensor performance level, and when an object is detected, automatically performing a vehicle manoeuvre to avoid colliding with the object.

Thereby it can be assured that the autonomous vehicle will not collide with a detected object, implying increased safety.

Optionally, the method may further comprise evaluating if the detected object is a false positive object detection, and if it is confirmed that it is a false positive object detection, stop performing the vehicle manoeuvre. Thereby, a more comfortable and/or smooth driving may be achieved. Further, the productivity can thereby also be improved, avoiding too many unnecessary stops.

Optionally, the vehicle manoeuvre may be at least one of a controlled stop, emergency braking and an emergency steering intervention. A controlled stop may be defined as stopping of the autonomous vehicle such that collision with the detected object is avoided and/or such that the autonomous vehicle is safely stopped, such as safely stopped without locking the wheels, without sliding etc. This may for example be achieved by braking the autonomous vehicle to standstill before reaching and hitting the object. It is well-known for the skilled person that vehicle speed has a direct correlation with braking distance to stop the vehicle. Therefore, a higher speed requires a longer braking distance than a braking distance when driving with a lower speed.

An emergency braking may be defined as braking the vehicle to standstill in shortest possible distance, such as braking with maximum possible braking force and/or braking with a braking force which is below the maximum possible braking force by no more than a predetermined level.

Optionally, a maximum allowed speed associated with a sensor performance level may be set such that the vehicle can perform a controlled stop without colliding with an object detected by the at least one object detection sensor.

Optionally, the method may further comprise, while utilizing the first sensor performance level, simultaneously evaluating a less restrictive sensor performance level with a higher maximum allowed speed, such as the second sensor performance level, and wherein evaluating the less restrictive sensor performance level comprises monitoring a rate of false positive object detections for the less restrictive sensor performance level, and when the rate of false positive object detections for the less restrictive sensor performance level is above a third false positive error threshold, utilizing a more restrictive sensor performance level which is associated with a lower maximum allowed speed, thereby decreasing the maximum allowed speed to a speed which is lower than the first maximum allowed speed. Thereby, a more predictive approach is achieved, wherein the vehicle's maximum allowed vehicle speed can be adjusted such that unnecessary braking is avoided.

According to a second aspect, the object is achieved by a control unit according to claim 14.

Thus, a control unit for controlling a maximum allowed speed of an autonomous vehicle is provided. The autonomous vehicle comprises at least one object detection sensor which is configured to detect objects around the vehicle, such as ahead of the vehicle, when the vehicle is driving autonomously, and wherein the at least one object detection sensor is configured to utilize at least two different sensor performance levels, wherein each sensor performance level is associated with a maximum allowed speed for the autonomous vehicle. The control unit is configured to perform the method according to any one of the embodiments of the first aspect of the invention.

Advantages and effects of the second aspect are analogous to the advantages and effects of the first aspect of the invention. It shall be noted that all embodiments of the second aspect of the invention are combinable with all embodiments of the first aspect of the invention, and vice versa.

The control unit is preferably an electronic control unit comprising processing circuitry for performing the method. The control unit may be denoted a computer. The control unit may comprise hardware or hardware and software. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise embedded hardware, sometimes with integrated software, where the hardware show close physical relationship. Examples of physical relationships are: shared casing and components mounted on one or several circuit boards. It shall also be noted that the control unit may be a combination of several communicatively connected control units.

According to a third aspect, the object is achieved by an autonomous vehicle according to claim 15.

Thus, an autonomous vehicle is provided which comprises at least one object detection sensor which is configured to detect objects around the vehicle, such as ahead of the vehicle, wherein the autonomous vehicle further comprises the control unit according to any one of the embodiments of the second aspect.

Advantages and effects of the third aspect are analogous to the advantages and effects of the first and second aspects of the invention. It shall be noted that all embodiments of the third aspect of the invention are combinable with all embodiments of the first and second aspects of the invention, and vice versa.

According to a fourth aspect, the object is achieved by a computer program, i.e. a computer program comprising program code means for performing the steps of any embodiment of the first aspect of the invention when said program is run on a computer.

According to a fifth aspect, the object is achieved by a computer readable medium, i.e. a computer readable medium carrying a computer program comprising program code means for performing the steps of any embodiment of the first aspect of the invention when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 4 is table showing three different sensor performance levels according to an example embodiment of the present invention;

FIG. 5 is a diagram showing maximum allowed speed which is adjustable according to an example embodiment of the present invention.

DETAILED DESCRIPTION OF EXAMPLE EMBODIMENTS OF THE INVENTION

Figure 1:
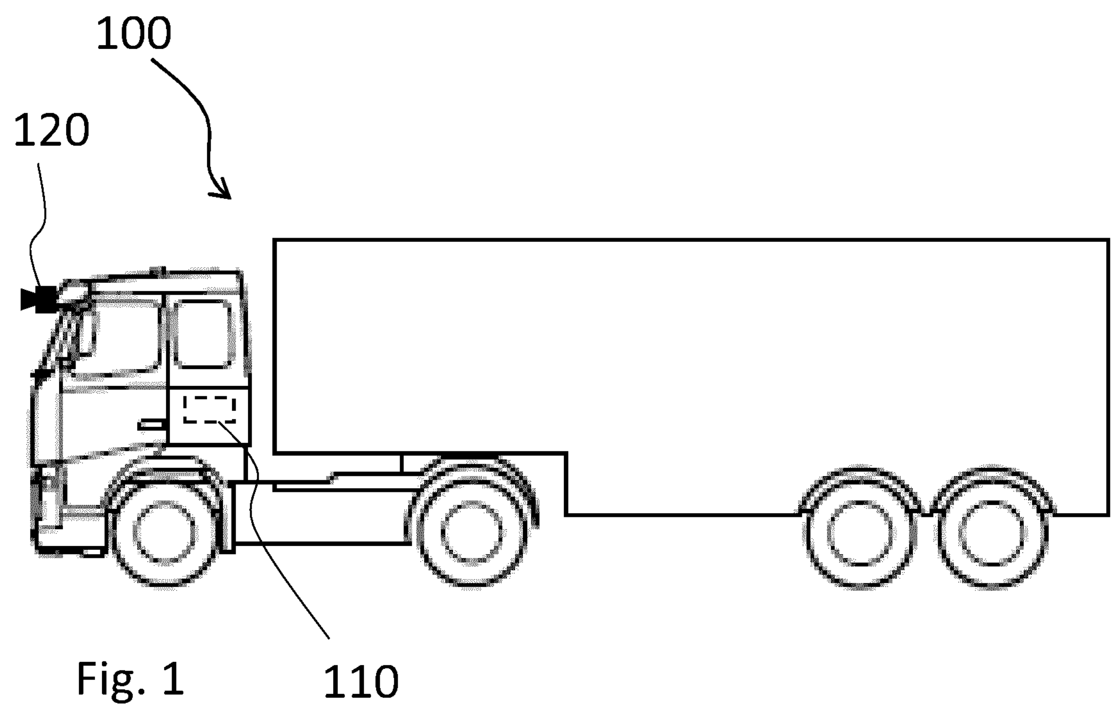
FIG. 1 is a side view of an autonomous vehicle according to an example embodiment of the present invention.

FIG. 1 depicts an autonomous vehicle 100, which here is a heavy-duty truck comprising a towing vehicle and a connected trailer. It shall however be noted that the autonomous vehicle may be any kind of vehicle but is typically a road vehicle or an off-road vehicle, such as any type of truck, bus, construction equipment, such as a wheel loader, and passenger car.

The autonomous vehicle 100 comprises means for automatically driving the vehicle 100, such as one or more actuators (not shown) which are adapted to control propulsion, braking and/or steering of the vehicle 100.

The autonomous vehicle 100 comprises an object detection sensor 120 which is configured to detect objects around the vehicle, in this case ahead of the vehicle, when the vehicle is driving autonomously. The object detection sensor 120 is configured to utilize at least two different sensor performance levels, wherein each sensor performance level is associated with a maximum allowed speed for the autonomous vehicle 100.

Figure 3:
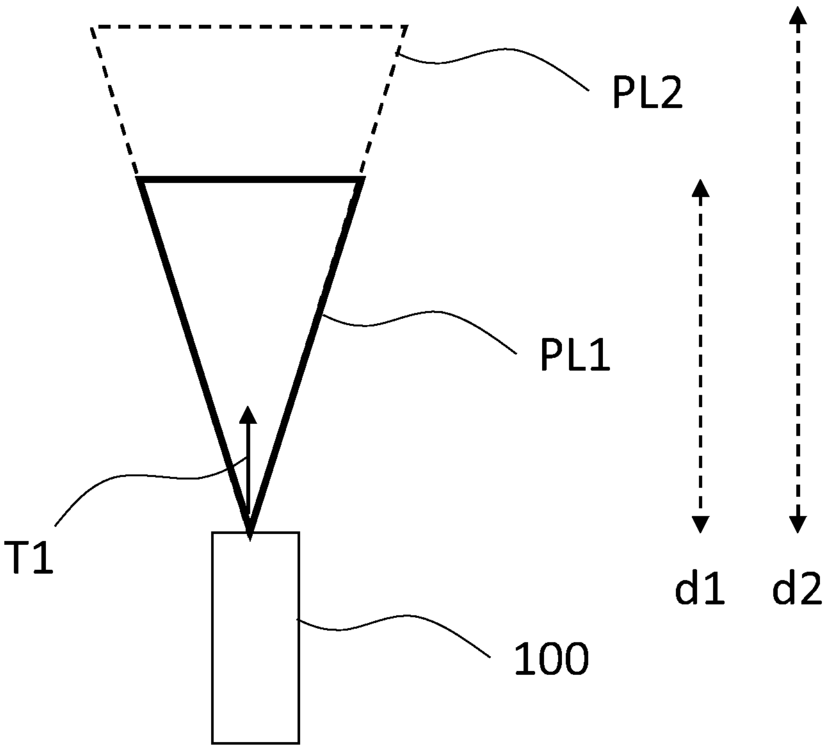
FIG. 3 is a schematic view from above of an autonomous vehicle according to an example embodiment of the present invention.

The sensor performance levels may for example be the sensor performance levels PL1, PL2 as shown in FIG. 3. More specifically, FIG. 3 shows an autonomous vehicle 100 from above which is driving in a travelling direction T1. The sensor performance level PL1, indicated by a triangle in front of the vehicle 100, has a specific field of view. More specifically, PL1 has as a detection distance d1 which here is 5 meters (m). Accordingly, when utilizing the sensor performance level PL1, an object can be detected when it is 5 m or less in front of the vehicle 100.

The sensor performance level PL2, indicated by a dashed line triangle, has a detection distance d2 of 7 m. Accordingly, when PL2 is utilized, an object can be detected when it is 7 m or less in front of the vehicle 100.

Thus, since PL2 can detect objects further away from the vehicle 100, a higher maximum allowed speed can be used when utilizing PL2.

The object detection sensor 120 may be any type of object detection sensor, such as a LIDAR (light detection and ranging) sensor, a RADAR (radio detection and ranging) sensor, a camera, such as a stereo camera, an ultrasonic sensor or the like.

A detected object may be any type of object which may interfere with and be in the way of the travelling path of the vehicle 100. For example, the detected object may be another vehicle, a vulnerable road used (VRU), such as a pedestrian or a bicyclist, or any other object which could compromise the safety for the vehicle 100 and/or for the detected object when the vehicle 100 is driving.

The autonomous vehicle 100 further comprises a control unit 110 which is a control unit according to an example embodiment of the second aspect of the invention. The control unit 110 may also be used to control the above-mentioned actuators. The vehicle 100 may comprise any number of control units and/or computers which are used for the autonomous driving. The autonomous vehicle 100 may also have wireless communication means (not shown) for wirelessly communicating with e.g. other vehicles and/or a command central. For example, the vehicle 100 may receive instructions regarding a driving mission from the command central.

Figure 2:
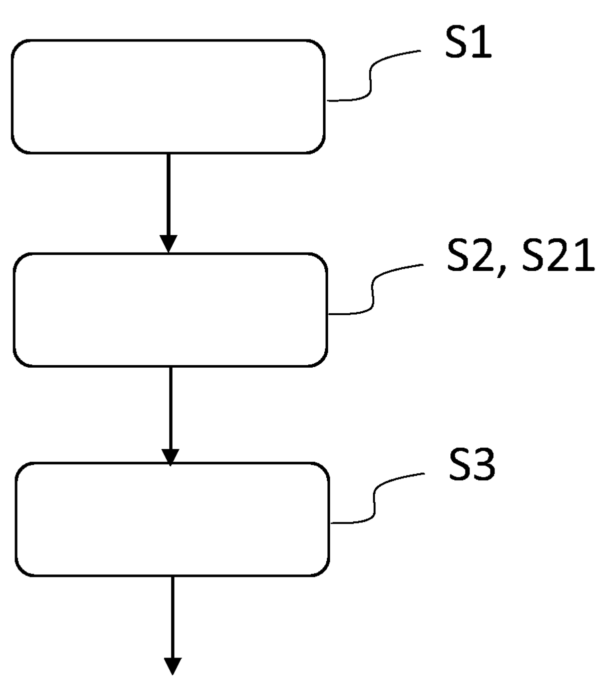
FIG. 2 is a flowchart of a method according to an example embodiment of the present invention.

Referring to especially FIGS. 1-3, a method according to an example embodiment of the present invention will be described.

The method comprises:

S1) utilizing a first sensor performance level PL1 during driving where the vehicle 100 is allowed to drive with a first maximum allowed speed.

While utilizing the first sensor performance level PL1, the method further comprises:

S2) simultaneously evaluating at least a second sensor performance level PL2 which is associated with a second maximum allowed speed which is higher than the first maximum allowed speed and which is a less restrictive sensor performance level, wherein a less restrictive sensor performance level is a sensor performance level with a higher probability of false positive object detections, wherein evaluating the second sensor performance level PL2 comprises:

S21) monitoring a rate of false positive object detections for the second sensor performance level PL2.

When the rate of false positive object detections for the second sensor performance level PL2 is below a first false positive error threshold, the method further comprises:

S3) utilizing a less restrictive sensor performance level which is associated with a higher maximum allowed speed, thereby increasing the maximum allowed speed from the first maximum allowed speed to a speed which is equal to or below the second maximum allowed speed.

Typically, the less restrictive sensor performance level may be the sensor performance level PL2. Thereby, the maximum allowed speed can be increased to the maximum allowed speed which is associated with PL2. Further, since PL2 is less restrictive, it also has a higher probability of false positive object detections.

The rate of false positive object detections may for example be a number of false positive object detections within a predefined time period.

The first and second sensor performance levels PL1, PL2 may be part of a plurality of predetermined sensor performance levels associated with a respective predetermined maximum allowed speed. For example, PL1 may be field 2 as shown in the table of FIG. 4, where a maximum allowed speed of 10 km/h is allowed, and PL2 may be field 1 in the table where a maximum allowed speed of 15 km/h is allowed.

Alternatively, the speed may be increased from the first maximum allowed speed to a maximum allowed speed below the second maximum allowed speed, i.e. in this case a speed lower than 15 km/h, which maximum allowed speed is associated with a sensor performance level which is more restrictive than the second sensor performance level PL2. A more restrictive sensor performance level is a sensor performance level with a lower probability of false positive object detections.

Figures 4, 5:
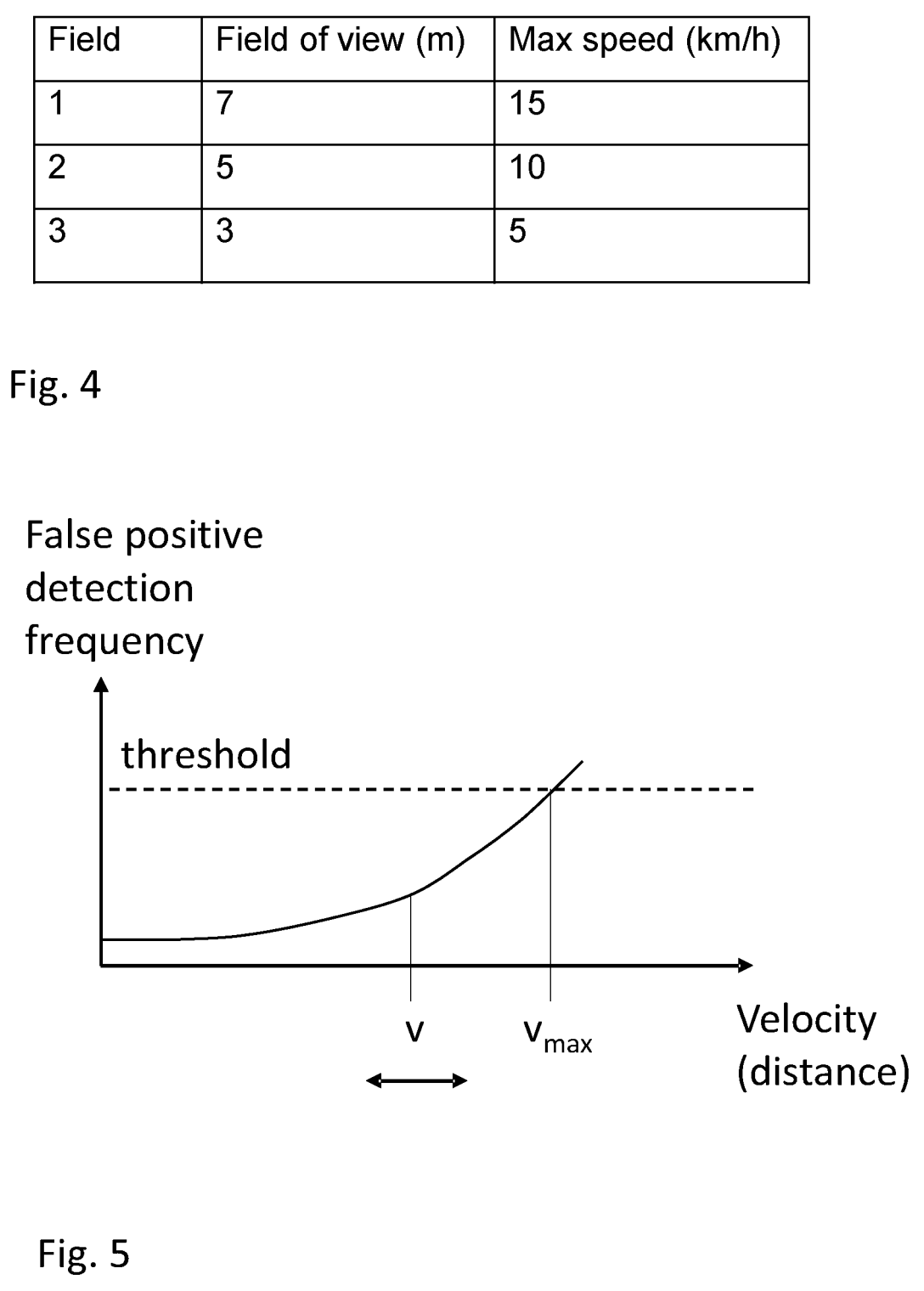

For example, and as illustrated in FIG. 5, the higher maximum allowed speed may be selected as a speed which is lower than the second maximum allowed speed, which in FIG. is denoted as $v_{max}$, and below the second maximum allowed speed $v_{max}$ with a predetermined safety margin. Accordingly, and as shown in FIG. 5, the currently used maximum allowed speed, here denoted as v, can be increased towards the second maximum allowed speed $v_{max}$, with a predetermined safety margin from $v_{max}$. The speed $v_{max}$ is as shown determined based on a threshold, which here is the first false positive error threshold. In the shown embodiment, this is defined as a specific false positive detection frequency, i.e. a rate of false positive object detections.

In the diagram shown in FIG. 5, it is also shown that the maximum allowed speed typically correlates with a detection distance. The curve as shown in the diagram of FIG. 5 may be predetermined. It may for example be a straight line, defined as a linear function, or it may be a curved line as shown. Alternatively, the shape of the curve may be obtained in real time by monitoring several sensor performance levels, e.g. simultaneously. For example, sensor performance levels may as shown in FIG. 5 be defined by different detection distances. By monitoring the false positive detection frequency for the different sensor performance levels, the curve can be formed for the current circumstances. This means for example that the shape of the curve may be formed based on the current ambient conditions, such as current weather conditions. This approach implies a more flexible and better adapted maximum allowed speed for the autonomous vehicle 100. The curve may be formed by interpolating between a number of points in the diagram.

Accordingly, a sensor performance level may be defined by a sensor field of view, such as detection distance. Additionally, or alternatively, a sensor performance level may be defined as a detection view angle, a number of sensor readings before reporting detection of an object, and a size limit for a detected object, such as defined by a number of pixels in which an object is detected and/or a number of reflected points indicative of an object.

The method may further comprise evaluating the first sensor performance level PL1 while the vehicle is utilizing the first sensor performance level PL1, wherein evaluating the first sensor performance level PL1 comprises monitoring a rate of false positive object detections for the first sensor performance level PL1, and when the rate of false positive object detections for the first sensor performance level PL1 is above a second false positive error threshold, decreasing the maximum allowed speed to a speed which is lower than the first maximum allowed speed. For example, as shown in FIG. 4, the maximum allowed speed may be decreased to 5 km/h, which here is a predetermined speed. This predetermined speed is a speed for field 3 which has a field of view, or detection distance, of 3 m. This field may accordingly be a predetermined sensor performance level which is more restrictive than the first sensor performance level PL1, wherein a more restrictive sensor performance level is a sensor performance level with a lower probability of false positive object detections.

The method may further comprise:

monitoring if an object is detected while utilizing the first sensor performance level PL1, and when an object is detected, automatically performing a vehicle manoeuvre to avoid colliding with the object.

Still further, the method may comprise evaluating if the detected object is a false positive object detection, and if it is confirmed that it is a false positive object detection, stop performing the vehicle manoeuvre. The vehicle manoeuvre may be at least one of a controlled stop, emergency braking and an emergency steering intervention.

The maximum allowed speed associated with a sensor performance level is preferably set such that the vehicle 100 can perform a controlled stop without colliding with an object detected by the at least one object detection sensor 120. For example, the maximum allowed speeds as shown in FIG. 4 are set such that the vehicle 100 can stop within 7, 5 or 3 m, corresponding to the different field of views.

The method may further comprise, while utilizing the first sensor performance level PL1, simultaneously evaluating a less restrictive sensor performance level with a higher maximum allowed speed, such as the second sensor performance level PL2, and wherein evaluating the less restrictive sensor performance level PL2 comprises monitoring a rate of false positive object detections for the less restrictive sensor performance level PL2, and when the rate of false positive object detections for the less restrictive sensor performance level PL2 is above a third false positive error threshold, utilizing a more restrictive sensor performance level which is associated with a lower maximum allowed speed, thereby decreasing the maximum allowed speed to a speed which is lower than the first maximum allowed speed. For example, referring to FIG. 4, if the rate of false positive object detections of PL2, i.e. field 1, is above the third false positive error threshold, the vehicle 100 may change its field of view to the more restrictive sensor performance level corresponding to field 3 in FIG. 3. As such, the maximum allowed speed will thereby be decreased from 10 km/h to 5 km/h. As a consequence, fewer false positive object detections will be detected, resulting in a smoother ride for the vehicle 100 with e.g. fewer unnecessary braking actions caused by false positive object detections.

The method as disclosed herein may be implemented in a computer program, such as a computer program which is run on the control unit 100.

Figure 6:
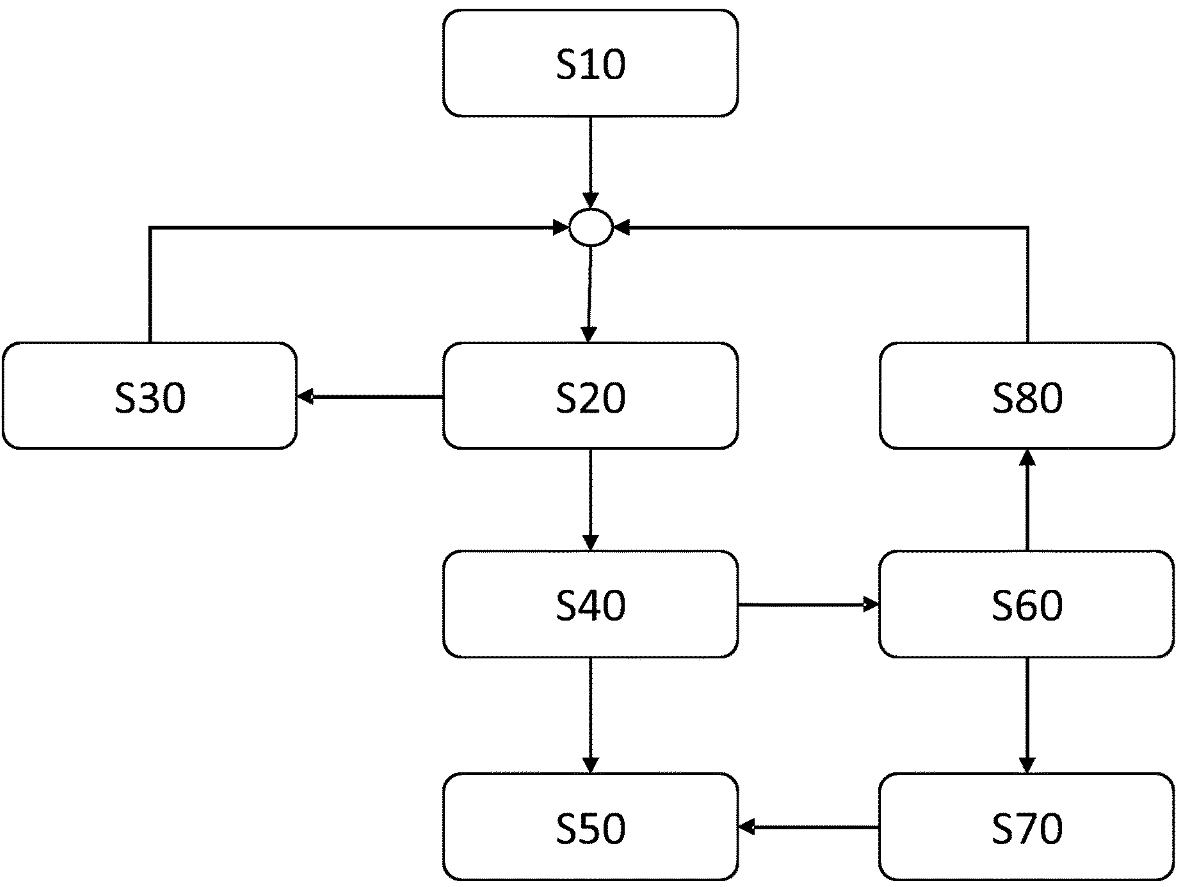
FIG. 6 is a flowchart of a method according to an example embodiment of the present invention.

FIG. 6 depicts a flowchart of a method according to an example embodiment which e.g. can be used by the control unit 110.

S10 corresponds to a start phase where an active sensor performance level is selected, such as the sensor performance level PL1 which corresponds to field 2 in FIG. 4.

When PL1 is selected, the method continues to S20 where the vehicle 100 is autonomously driven and where PL1 is utilized, i.e. the vehicle 100 is now allowed to drive with a maximum allowed speed of 10 km/h.

Simultaneously, the sensor performance level PL2 is evaluated by monitoring a rate of false positive object detections for the second sensor performance level PL2. Accordingly, a rate of false positive object detections is monitored for field 1 which has a field of view of 7 m and a maximum allowed speed of 15 km/h.

If the rate of false positive object detections for the second sensor performance level PL2 is below a first false positive error threshold, the method continues to S30 where a less restrictive sensor performance level is utilized which is associated with a higher maximum allowed speed. For example, when using a discrete approach, the sensor performance level PL2 corresponding to field 1 may be utilized. Thereby, the maximum allowed speed will be increased from the first maximum allowed speed, i.e. 10 km/h, to 15 km/h. When this is performed, the method will revert to S20 where now PL2 is the active, i.e. utilized, sensor performance level for the vehicle 100.

On the other hand, if an object is detected when utilizing the sensor performance level PL1 in S20, the method continues to S40 where an emergency braking action is performed. When the emergency braking action is completed, the method continues to S50 where the vehicle 100 is stopped, i.e. standing still.

While performing the emergency braking action in S40, it may be determined that the object which was detected was a false object, i.e. it was a false positive object detection of the at least one object detection sensor 120. In such a case, the method continues to S60 where the brakes of the vehicle 100 are released.

If no more predetermined sensor performance level which is more restrictive is available, the vehicle 100 may be controlled to perform a controlled stop, corresponding to S70, until the vehicle 100 is standing still, i.e. S50.

However, if a more restrictive sensor performance level is available, in this case the sensor performance level corresponding to field 3 in FIG. 4, this sensor performance level is utilized instead. Thereby, the maximum allowed speed will be decreased to 5 km/h instead of 10 km/h. When this is done, the method continues to S20 again.

Even though only three sensor performance levels are shown in FIG. 4, it shall be noted that the method may use any number of sensor performance levels.

It is to be understood that the present invention is not limited to the embodiments described above and illustrated in the drawings; rather, the skilled person will recognize that many changes and modifications may be made within the scope of the appended claims.

The invention claimed is:

1. A method for controlling a maximum allowed speed of an autonomous vehicle, wherein the autonomous vehicle comprises at least one object detection sensor which is configured to detect objects around the vehicle, such as ahead of the vehicle, when the vehicle is driving autonomously, and wherein the at least one object detection sensor is configured to utilize at least two different sensor performance levels, wherein each sensor performance level is associated with a maximum allowed speed for the autonomous vehicle, the method comprising:

utilizing a first sensor performance level during driving where the vehicle is allowed to drive with a first maximum allowed speed, while utilizing the first sensor performance level, simultaneously evaluating at least a second sensor performance level which is associated with a second maximum allowed speed which is higher than the first maximum allowed speed and which is a less restrictive sensor performance level, wherein a less restrictive sensor performance level is a sensor performance level with a higher probability of false positive object detections, wherein evaluating the second sensor performance level comprises monitoring a rate of false positive object detections for the second sensor performance level, when the rate of false positive object detections for the second sensor performance level is below a first false positive error threshold, utilizing a sensor performance level that is less restrictive than the first sensor performance level, and is associated with a higher maximum allowed speed equal to or lower than the second maximum allowed speed, thereby increasing the maximum allowed speed from the first maximum allowed speed.

2. The method according to claim 1, wherein the first and second sensor performance levels are part of a plurality of predetermined sensor performance levels associated with a respective predetermined maximum allowed speed, and/or wherein increasing the maximum allowed speed comprises increasing the maximum allowed speed to the second maximum allowed speed.

3. The method according to claim 1, wherein the speed is increased from the first maximum allowed speed to a maximum allowed speed below the second maximum allowed speed, wherein the increased maximum allowed speed is associated with a sensor performance level which is more restrictive than the second sensor performance level, wherein a more restrictive sensor performance level is a sensor performance level with a lower probability of false positive object detections.

4. The method according to claim 3, wherein the higher maximum allowed speed is selected as a speed which is lower than the second maximum allowed speed and below the second maximum allowed speed with a predetermined safety margin.

5. The method according to claim 1, wherein a sensor performance level is defined by at least one of a sensor field of view, such as a detection distance and/or a detection view angle, a number of sensor readings before reporting detection of an object, and a size limit for a detected object, such as defined by a number of pixels in which an object is detected and/or a number of reflected points indicative of an object.

6. The method according to claim 1, further comprising evaluating the first sensor performance level while the vehicle is utilizing the first sensor performance level, wherein evaluating the first sensor performance level comprises monitoring a rate of false positive object detections for the first sensor performance level, and when the rate of false positive object detections for the first sensor performance level is above a second false positive error threshold, decreasing the maximum allowed speed to a speed which is lower than the first maximum allowed speed.

7. The method according to claim 6, wherein decreasing the maximum allowed speed comprises decreasing the maximum allowed speed to a lower predetermined speed which is associated with a predetermined sensor performance level which is more restrictive than the first sensor performance level, wherein a more restrictive sensor performance level is a sensor performance level with a lower probability of false positive object detections.

8. The method according to claim 1, further comprising:

monitoring if an object is detected while utilizing the first sensor performance level, and when an object is detected, automatically performing a vehicle manoeuvre to avoid colliding with the object.

9. The method according to claim 8, further comprising: evaluating if the detected object is a false positive object detection, and if it is confirmed that it is a false positive object detection, stop performing the vehicle manoeuvre.

10. The method according to claim 8, wherein the vehicle manoeuvre is at least one of a controlled stop, emergency braking and an emergency steering intervention.

11. The method according to claim 7, wherein when there is no predetermined sensor performance level which is more restrictive, available, controlling the vehicle to perform a controlled stop.

12. The method according to claim 1, wherein a maximum allowed speed associated with a sensor performance level is set such that the vehicle can perform a controlled stop without colliding with an object detected by the at least one object detection sensor.

13. The method according to claim 1, further comprising, while utilizing the first sensor performance level, simultaneously evaluating a less restrictive sensor performance level with a higher maximum allowed speed, such as the second sensor performance level, and wherein evaluating the less restrictive sensor performance level comprises monitoring a rate of false positive object detections for the less restrictive sensor performance level, and when the rate of false positive object detections for the less restrictive sensor performance level is above a third false positive error threshold, utilizing a more restrictive sensor performance level which is associated with a lower maximum allowed speed, thereby decreasing the maximum allowed speed to a speed which is lower than the first maximum allowed speed.

14. A control unit controlling a maximum allowed speed of an autonomous vehicle, wherein the autonomous vehicle comprises at least one object detection sensor which is configured to detect objects around the vehicle, such as ahead of the vehicle, when the vehicle is driving autonomously, and wherein the at least one object detection sensor is configured to utilize at least two different sensor performance levels, wherein each sensor performance level is associated with a maximum allowed speed for the autonomous vehicle, wherein the control unit is configured to perform the method according to claim 1.

15. An autonomous vehicle comprising at least one object detection sensor which is configured to detect objects around the vehicle, such as ahead of the vehicle, wherein the autonomous vehicle further comprises the control unit according to claim 14.

16. A non-transitory computer readable medium carrying a computer program comprising program code for performing the steps of claim 1 when said program code is run on a computer.

* * * * *